United States Patent
Augenstein et al.

(10) Patent No.: US 7,937,366 B2
(45) Date of Patent: *May 3, 2011

(54) RECONCILIATION OF LOCAL AND REMOTE BACKUP DATA

(75) Inventors: Oliver Augenstein, Dettenhausen (DE); Kala Dutta, San Jose, CA (US); Neeta Garimella, San Jose, CA (US); Avishai Haim Hochberg, San Jose, CA (US); Choonsu Peter Park, Cupertino, CA (US); Neil Gregory Rasmussen, Livermore, CA (US); James Patrick Smith, Redwood City, CA (US); Christopher Zaremba, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/179,518

(22) Filed: Jul. 24, 2008

(65) Prior Publication Data

US 2008/0281881 A1 Nov. 13, 2008

Related U.S. Application Data

(63) Continuation of application No. 11/168,634, filed on Jun. 28, 2005, now Pat. No. 7,440,984.

(51) Int. Cl.
*G06F 7/00* (2006.01)
(52) U.S. Cl. ........ 707/640; 707/641; 707/658; 707/659; 707/661

(58) Field of Classification Search .................. 707/640, 707/641, 658, 659, 661
See application file for complete search history.

(56) References Cited

U.S. PATENT DOCUMENTS

| | | | |
|---|---|---|---|
| 6,308,283 | B1 | 10/2001 | Galipeau et al. |
| 6,549,921 | B1 | 4/2003 | Ofek |
| 6,587,935 | B2 | 7/2003 | Ofek |
| 6,820,136 | B1 | 11/2004 | Pham et al. |
| 6,820,180 | B2 | 11/2004 | McBrearty et al. |
| 2001/0016853 | A1 | 8/2001 | Kucala |
| 2001/0049749 | A1 | 12/2001 | Katsuragi et al. |
| 2004/0039889 | A1 | 2/2004 | Elder et al. |
| 2004/0193952 | A1 | 9/2004 | Narayanan et al. |
| 2004/0205309 | A1 | 10/2004 | Watanabe |
| 2006/0230082 | A1 | 10/2006 | Jasrasaria |

FOREIGN PATENT DOCUMENTS

| | | |
|---|---|---|
| CN | 1534518 | 6/2004 |
| JP | 2002132561 | 5/2002 |
| WO | 03044697 | 5/2003 |

OTHER PUBLICATIONS

Summary of Art cited in counterpart Chinese Office Action dated Jan. 4, 2008, 1 pg.

*Primary Examiner* — Etienne P LeRoux
*Assistant Examiner* — Cindy Nguyen
(74) *Attorney, Agent, or Firm* — Rabindranath Dutta Konrad Raynes and Victor LLP

(57) ABSTRACT

Provided are a system, an article of manufacture, and a computer program product, wherein a first set of backup data is stored in a first computational device and a second set of backup data is stored in a second computational device. Metadata corresponding to the first set of backup data is maintained in the second computational device. The first set of backup data is reconciled with the second set of backup data based on the metadata.

12 Claims, 5 Drawing Sheets

RECONCILIATION OF LOCAL AND REMOTE BACKUP DATA

CROSS-REFERENCE TO RELATED APPLICATIONS

This application is a continuation of application Ser. No. 11/168,634 filed on Jun. 28, 2005, which is incorporated herein by reference in its entirety.

BACKGROUND

1. Field

The disclosure relates to a method, system, and article of manufacture for reconciling local and remote backup data.

2. Background

Data in information technology systems, including storage systems, may be replicated or backed up for a variety of reasons, such as, for facilitating recovery from failure of storage systems, etc. Certain backup systems may store and manage data locally, whereas other backup systems may store and manage data on a remote server.

In certain storage management systems, backup data can be generated and stored on local systems, where the local systems also participate in a server-based storage management system. For example, the Tivoli* Data Protection for Hardware suite of products can create local or remote backups of DB2*, Oracle* and mySAP* data sets on IBM Enterprise Storage Server* disks, where the IBM Enterprise Storage Server may be a disk storage server that includes one or more processors coupled to storage devices, including high capacity scalable storage devices, such as, Redundant Array of Independent Disks (RAID), etc.

* IBM, Enterprise Storage Server, DB2, Tivoli, are trademarks or registered trademarks of International Business Machines Corp.
* Oracle is a trademark or registered trademark of Oracle Corp.
* mySAP is a trademark or registered trademark of SAP AG.

The remote backup server may have a different set of interfaces and controls for storing, accessing and modifying backup data in comparison to the local system. For example, certain interfaces for storing, accessing and modifying backup data that are available on the remote backup server may be absent in the local system. A user may use one interface to access and modify data stored on a local system and another interface to access, and modify data stored on the remote backup server.

SUMMARY OF THE DESCRIBED EMBODIMENTS

Provided are a method, a system, an article of manufacture, and a computer program product, wherein a first set of backup data is stored in a first computational device and a second set of backup data is stored in a second computational device. Metadata corresponding to the first set of backup data is maintained in the second computational device. The first set of backup data is reconciled with the second set of backup data based on the metadata.

In additional embodiments, the first computational device is a local system and the second computational device is a remote server, wherein the first set of backup data is local backup data and the second set of backup data is remote backup data, and wherein the remote server provides a greater number of data storage and data access functions than the local system.

In yet additional embodiments, the reconciling of the local backup data with the remote backup data further comprises determining from the metadata whether a data container included in the local backup data is absent in the remote backup data, and deleting the data container included in the local backup data, in response to determining that the data container included in the local backup data is absent in the remote backup data.

In further embodiments, the reconciling of the local backup data with the remote backup data further comprises determining from the metadata whether a data container included in the remote backup data is absent in the local backup data, and deleting the data container included in the remote backup data, in response to determining that the data container included in the remote backup data is absent in the local backup data.

In yet further embodiments, all constituent data containers of a group are deleted from the remote backup data, in response to determining during the reconciling of the local backup data with the remote backup data that at least one of the constituent data containers is absent in the local backup data. A determination is made of the status of previously initiated asynchronous backup copy operations for possible updates to local and remote storage in response to receiving a request at the local system.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow the management of local data backups to be coordinated with the management of remote data backups. A unified representation of all backup data may be provided to an end user by managing the local data backups and the remote data backups together.

Figure 1:
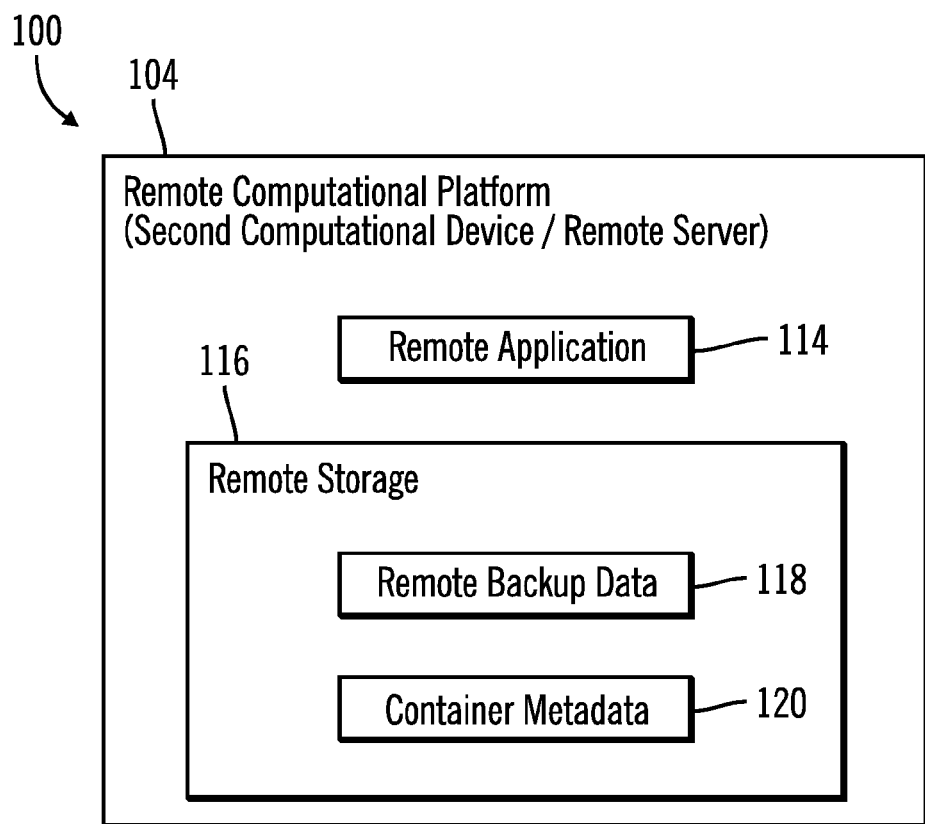
FIG. 1 illustrates a block diagram of a computing environment in accordance with certain embodiments.
Figure 1:
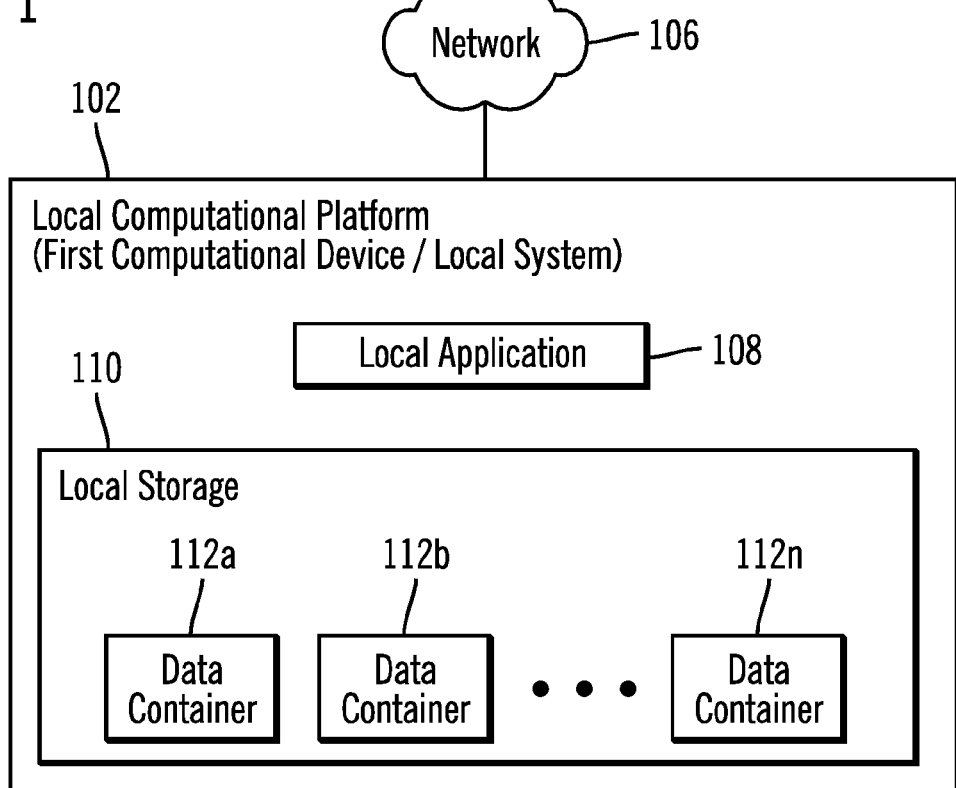

FIG. 1 illustrates a block diagram of a computing environment 100 in accordance with certain embodiments.

At least one local computational platform 102 is coupled to a remote computational platform 104 over a network 106. In certain embodiments, the local computational platform 102 and the remote computational platform 104 may comprise any suitable computational platforms, including those presently known in the art, such as, personal computers, workstations, mainframes, midrange computers, network appliances, palm top computers, telephony devices, blade computers, hand held computers, etc. The network 106 may comprise any network known in the art, such as a Storage Area Network (SAN), Local Area Network (LAN), Wide Area Network (WAN), the Internet, an Intranet, etc.

The local computational platform 102 includes a local application 108 and is coupled to a local storage 110, where backup data stored in the local storage 110 may be logically represented in a plurality of data containers 112a, 112b, ..., 112n. The local storage 110 may include a plurality of storage devices, such as disk drives, tape drives, etc., whose contents may be logically represented in the data containers 112a ... 112n. Although the local storage 110 is shown inside the local computational platform 102, in alternative embodiments the local storage 110 may be located outside the local computational platform 102. In certain embodiments, the data containers 112a ... 112n may include any suitable data structures that are capable of representing one or more units of backup data. For example, in certain embodiments, the data containers 112a ... 112n may be objects of a object-oriented programming system. In certain other embodiments the data containers may be logical units or groups of logical units.

The remote computational platform 104 includes a remote application 114 and is coupled to a remote storage 116, where the remote storage 116 includes remote backup data 118 and container metadata 120. The remote storage 116 may include a plurality of storage devices, such as disk drives, tape drives, etc. Although the remote storage 116 is shown inside the remote computational platform 104, in alternative embodiments the remote storage 116 may be located outside the remote computational platform 104.

The remote backup data 118 includes backup data stored in the remote storage 116. The container metadata 120 stores metadata corresponding to the data containers 112a ... 112n, where the metadata is information related to the data containers 112a ... 112n. For example, the container metadata 120 may store which data containers 112a ... 112n are present in the local computational platform 102 without storing the data contained in the data containers 112a ... 112n.

While a single local application 108 and a single remote application 114 are shown in FIG. 1, in alternative embodiments the functions performed by the single local application 108 may be performed by a plurality of applications in the local computational platform 102, and the functions performed by the single remote application 114 may be performed by a plurality of applications in the remote computational platform 104. For example, in certain embodiments the functions performed by the local application 108 may be performed by a local backup manager (not shown) that manages the data containers 112a ... 112n and a local backup software (not shown) that performs data backups to the remote computational platform 104.

In certain embodiments illustrated in FIG. 1, data is backed up locally in the local storage 110 of the local computational platform 102 and the backed up data is stored in the data containers 112a ... 112n. Data may also be backed up in the remote storage 116 coupled to the remote computational device 104. Certain embodiments allow reconciliation of backed up data between the local storage 110 and the remote storage 116. Reconciliation of backed up data causes the backed up data to be consistent between the local storage 110 and the remote storage 116.

Although only a single local computational platform 102 is illustrated in FIG. 1, in alternative embodiments a plurality of local computational platforms may be present and may be coupled to the remote computational platform 104 via the network 106. In such alternative embodiments, reconciliation of backed up data causes the backed up data to be consistent between the local computational platforms and the remote computational platform 104.

In certain embodiments backed up data is reconciled between the local storage 110 and the remote storage 116, such that the backed up data of the remote storage 116 and the backed up data of the local storage 110 are consistent with each other.

Figure 2:
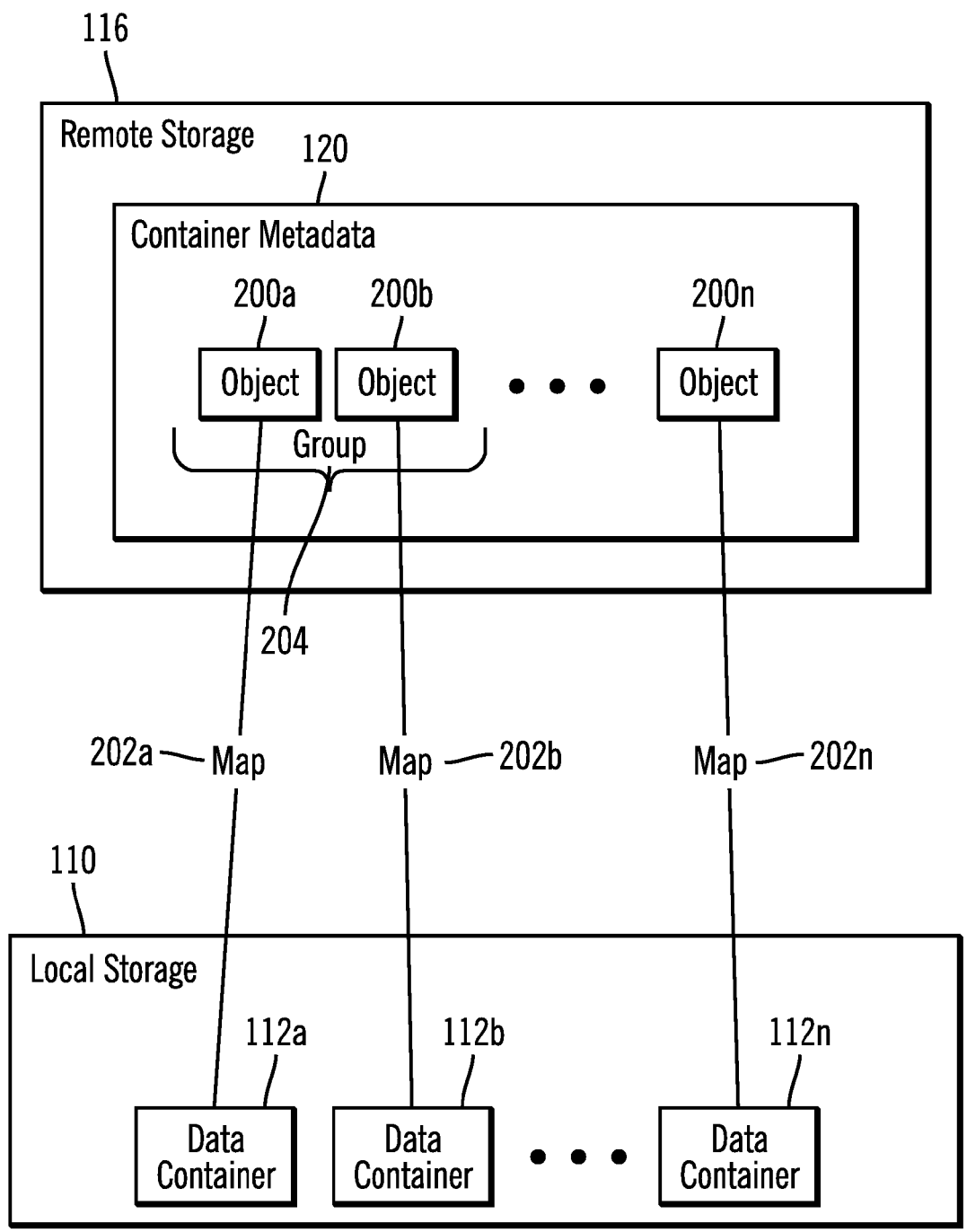
FIG. 2 illustrates a block diagram that shows data structures implemented in the computing environment, in accordance with certain embodiments.

FIG. 2 illustrates a block diagram that shows data structures implemented in the computing environment 100, in accordance with certain embodiments. In certain embodiments, the container metadata 120 may include objects 200a, 200b, ... 200n to which the data containers 112a ... 112n included in the local storage 110 may be mapped. For example, the data container 112a may be mapped (reference numeral 202a) to the object 200a, the data container 112b may be mapped (reference numeral 202b) to the object 200b, and the data container 112n may be mapped (reference numeral 202n) to the object 200n. While a one to one mapping has been shown between the data containers 112a ... 112n and the objects 200a ... 200n, in alternative embodiments other types of mapping may be performed.

In certain embodiments a plurality of objects selected from the objects 200a ... 200n may form one or more groups. For example, object 200a and object 200b may form the group 204, where the group 204 may be referred to as a backup group. The backup group 200 may represent the metadata of the data containers 112a, 112b. Although a single backup group 200 has been illustrated in FIG. 2, in alternative embodiments additional backup groups may be created from the objects 200a ... 200n.

In certain embodiments each data container selected from the data containers 112a ... 112n that is obtained for backup in the remote storage 116 is assigned an identifier that is unique within the context of all the data containers 112a ... 112n, i.e., different data containers have different identifiers. The identifiers may be used to uniquely identify the data containers 112a ... 112n.

Therefore, FIG. 2 illustrates certain embodiments in which metadata corresponding to the data containers 112a ... 112n is stored in the objects 200a ... 200n on the remote storage 116. In alternative embodiments, other data structures different from the objects 200a ... 200n may be used to represent the metadata corresponding to the data containers 112a ... 112n.

Certain embodiments allow the container metadata 120 to be used to reconcile the backup data stored in the local storage 110 with the backup data stored in the remote storage 116, such that the backup data of the remote storage 116 is consistent with the backup data of the local storage 110.

Figure 3:
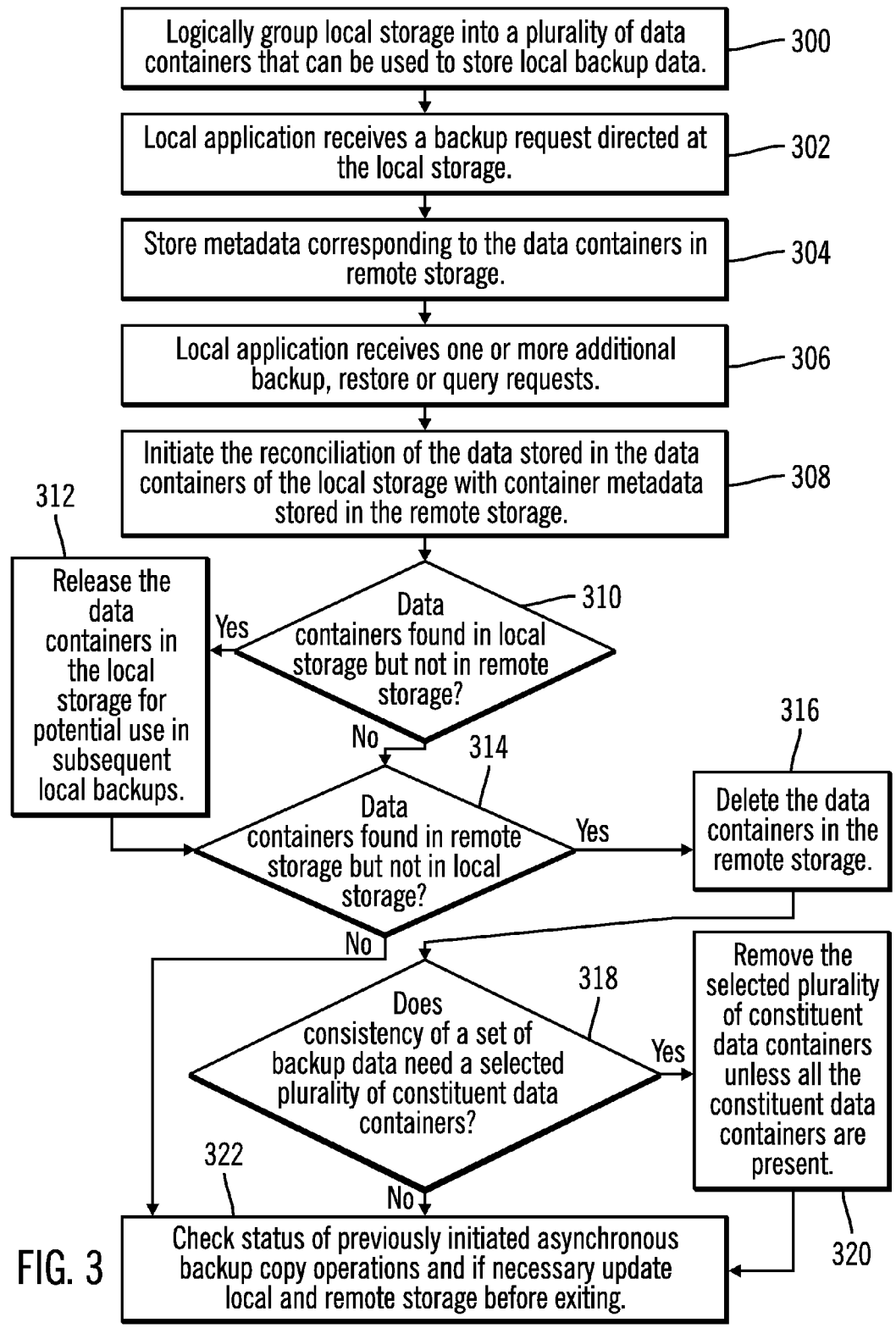
FIG. 3 illustrates a first flowchart that shows the reconciliation of local and remote backup data, in accordance with certain embodiments.

FIG. 3 illustrates a first flowchart that shows the reconciliation of local and remote backup data, in accordance with certain embodiments. The operations shown in the flowchart of FIG. 3 may be implemented in the computing environment 100 by the local computational platform 102 and the remote computational platform 104.

Control starts at block 300, where the local application 108 logically groups data stored in the local storage 110 into a plurality of data containers 112a ... 112n that can be used to store local backup data.

The local application 108 receives (at block 302) a backup request directed at the local storage 110. In certain embodiments the backup request may attempt to secure one or more data containers selected from the data containers 112a ... 112n. In response, the local application 108 in coordination with remote application 114 stores (at block 304) metadata corresponding to the data containers 112a ... 112n in the container metadata 120 of the remote storage 116. The container metadata 120 may store a plurality of objects 200a ... 200n corresponding to the data containers 112a ... 112n.

The local application 108 receives (at block 306) one or more additional backup, restore or query requests. On receiving the additional backup, restore or query requests, the local application 108 in coordination with the remote application 114 initiates (at block 308) the reconciliation of the data stored in the data containers 112a . . . 112n of the local storage 110 with the container metadata 120 stored in the remote storage 116. In certain embodiments a list of all of the data containers that store backup data in the local storage 110 is generated and a list of all the data containers whose metadata is stored in the container metadata 120 in the remote storage 116 is generated.

Control proceeds to block 310, where a determination is made that certain data containers have been found in local storage 110 but are absent in the remote storage 116. If so, then the data containers in the local storage that are absent in the remote storage 116 are released (at block 312) for potential use in subsequent local backups, before control proceeds to block 314.

If at block 310, no data containers are found in local storage 110 that are not present in the remote storage 116, then control proceeds block 314 where a determination is as to whether selected data containers have been found in the remote storage 116 but are absent in the local storage 110. If so, the selected data containers in the container metadata 120 of the remote storage 116 are deleted (at block 316) from the remote storage 116. Such a situation may occur when a user removes data containers from the plurality of data containers 112a . . . 112n, such that the removed data containers are no longer available. Control proceeds to block 318.

At block 318, a determination is made as to whether consistency of a set of backup data needs a selected plurality of constituent data containers. If so, then the selected plurality of constituent data containers are removed (at block 320) unless all the constituent data containers are present. For example, a data backup may be comprised of data containers "A", "B", and "C" and furthermore the data backup is invalid unless all three data containers "A", "B", and "C" are present. A user removes the data container "B" from the control of the local application 108. During reconciliation data container "B" is removed from the remote storage 116. Since data containers "A" and "C" also rely on the existence of data container "B", data containers "A" and "C" are also removed from both the remote storage 116 and the local storage 110 and control proceeds to block 322.

If at block 318 the consistency of a set of backup data does not need a selected plurality of constituent data containers, then the status of any previously initiated asynchronous backup copy operations is checked (at block 322). If necessary, the local storage 110 and the remote storage 116 are updated and the process exits. Since reconciliation of backed up data in the local storage 110 and the remote storage 116 may be performed before any backup, restore, or query operations, the status of asynchronous backup copy operations may be checked during reconciliation of backup data. For example, a backup of a set of data may be translated into a local backup of exemplary data containers "A", "B", "C". The mechanism used to backup the data locally make take a significant period of time, such as several minutes or hours. The data containers may initiate the backup operation, mark the data containers as being used in both the local storage 110 and the remote storage 116. At this point in time, the backup application for asynchronous copy can be terminated. At a subsequent time, a user issues a backup, restore or query request. During the reconciliation process a determination can be made as to whether the previous local backup operation is still in progress and the status of the previous local backup operation is checked on the local storage 110. If the previous local backup operation has completed the local storage 110 and the remote storage 116 are updated to reflect that the data containers represent a completed backup process.

If at block 314, a determination is made that no data containers are found in the remote storage that are not there in the local storage then control proceeds to block 322.

Therefore, FIG. 3 illustrates certain embodiments for reconciling backup data stored in the local storage 110 with backup data stored in the remote storage 116. Asynchronous backup operations may also be handled during reconciliation of the backup data. In alternative embodiments, blocks 310-322 may be performed in a different order than that shown in FIG. 3.

Figure 4:
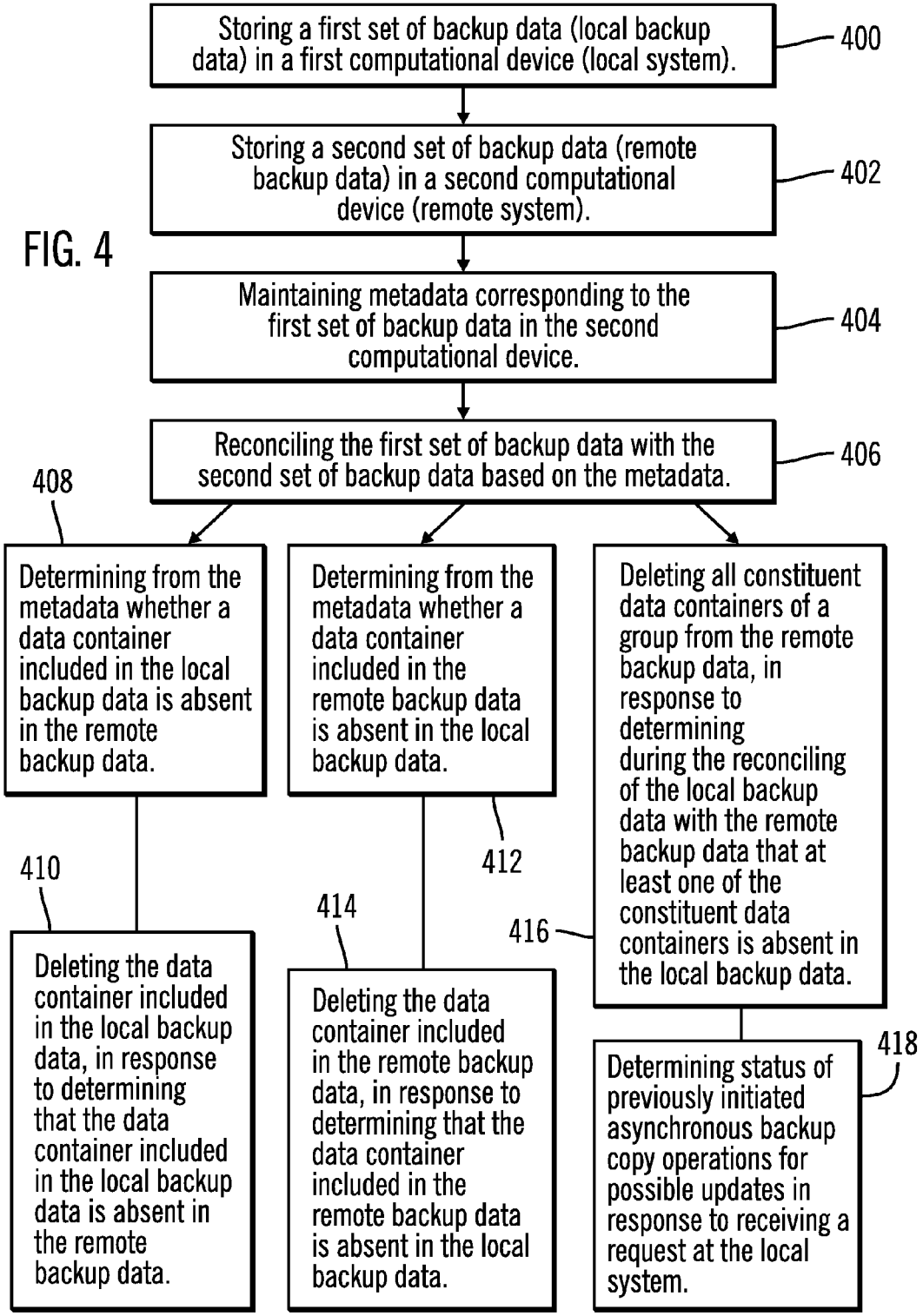
FIG. 4 illustrates a second flowchart that illustrates the reconciliation of local and remote backup data, in accordance with certain embodiments.

FIG. 4 illustrates a second flowchart that illustrates the reconciliation of local and remote backup data, in accordance with certain embodiments. The operations shown in the flowchart of FIG. 4 may be implemented in the computing environment 100.

Control starts at block 400, where a first set of backup data (local backup data) is stored in a first computational device (local system) 102 in the data containers 112a . . . 112n. A second set of backup data (remote backup data) is stored (at block 402) in a second computational device (remote system) 104.

The remote application 114 maintains (at block 404) metadata 120 corresponding to the first set of backup data in the second computational device 104. The first set of backup data is reconciled (at block 406) with the second set of backup data based on the metadata 120.

The reconciliation may include determining (at block 408) from the metadata 120 whether a data container included in the local backup data is absent in the remote backup data, and deleting (at block 410) the data container included in the local backup data, in response to determining that the data container included in the local backup data is absent in the remote backup data.

The reconciliation may also include determining (at block 412) from the metadata 120 whether a data container included in the remote backup data is absent in the local backup data, and deleting (at block 414) the data container included in the remote backup data, in response to determining that the data container included in the remote backup data is absent in the local backup data.

The reconciliation may also include deleting (at block 416) all constituent data containers of a group from the remote backup data, in response to determining during the reconciling of the local backup data with the remote backup data that at least one of the constituent data containers is absent in the local backup data. Additionally in certain embodiments, a determination (at block 418) is made of the status of previously initiated asynchronous backup copy operations in response to receiving a request at the local system. Based on the status of previously initiated asynchronous copy operations updates may be made to the local storage 110 and the remote storage 116.

Therefore, FIG. 4 illustrates certain embodiments for reconciling local backup data with remote backup data. Groups of data containers may be handled together in certain embodiments. Additionally, the completion status of previously initiated asynchronous copy operations for backup may be determined and possible updates may be made to the local storage 110 and the remote storage 116 based on the completion status.

Certain embodiments allow the functions of a local data storage management system to be coordinated with the functions of a remote data storage management system by using a reconciliation function that can reconcile the repositories of the local data storage management system and the remote data storage management system. The local data storage is represented via metadata stored in the in the remote backup system. The remote backup system can be used to present an integrated set of backup data which is stored both locally and remotely, and can also be used to exploit policy management constructs to control the local backup data.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where the medium may comprise hardware logic [e.g., an integrated circuit chip, Programmable Gate Array (PGA), Application Specific Integrated Circuit (ASIC), etc.] or a computer readable medium, such as, magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
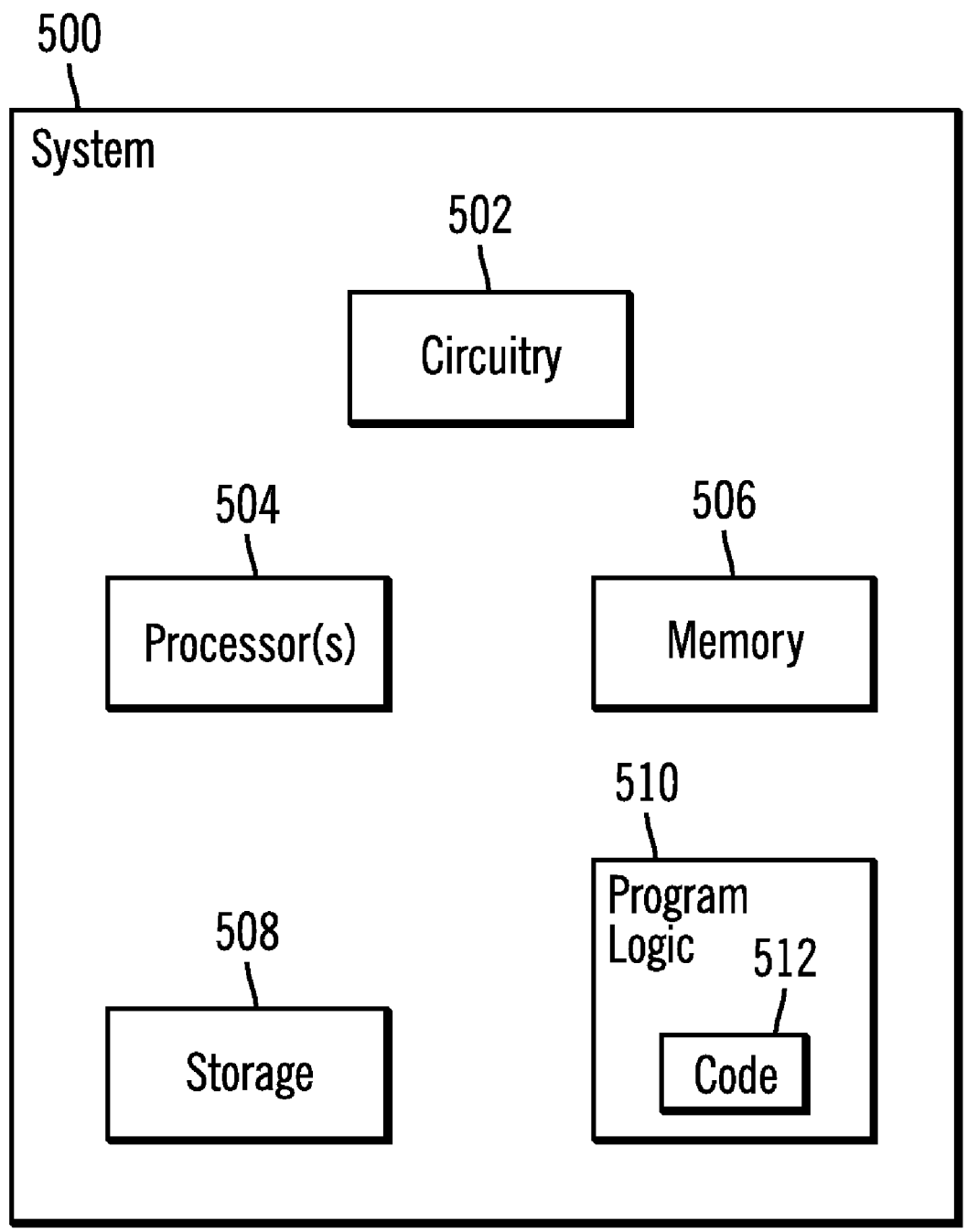
FIG. 5 illustrates a system in which certain embodiments are implemented, in accordance with certain embodiments.

FIG. 5 illustrates a block diagram of a system 500 in which certain embodiments may be implemented. In certain embodiments, the computational platforms shown in FIG. 1, such as the local computational platform 102 and the remote computational platform 104 may be implemented in accordance with the system 500. The system 500 may include a circuitry 502 that may in certain embodiments include a processor 504. The system 500 may also include a memory 506 (e.g., a volatile memory device), and storage 508. Certain elements of the system 500 may or may not be found in the computational platforms 102, 104. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 3 and 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A system, comprising:
   memory;
   a first computational device coupled to the memory;
   a second computational device coupled to the memory; and
   processor coupled to the memory, wherein the processor performs:
   (i) storing a first set of backup data in a first computational device; storing a second set of backup data in a second computational device; and
   (ii) maintaining metadata corresponding to the first set of backup data in the second computational device;
   (iii) grouping the second set of backup data into a group that is comprised of a plurality of constituent data containers; and
   (iv) reconciling the first set of backup data with the second set of backup data based on the metadata, wherein all constituent data containers of the group are deleted from the second set of backup data, in response to determining during the reconciling of the first set of backup data with the second set of backup data that at least one of the constituent data containers is absent in the first set backup data, wherein during the reconciling a status of previously initiated asynchronous backup copy operations is determined, wherein if the previously initiated asynchronous backup operations have completed then the first and the second computational devices are updated to reflect that any data container that is present is representative of completion of the previously initiated asynchronous backup copy operations.

2. The system of claim 1, wherein the first computational device is a local system and the second computational device is a remote server, wherein the first set of backup data is local backup data and the second set of backup data is remote backup data.

3. The system of claim 2, wherein the reconciling of the local backup data with the remote backup data further comprises:
   determining from the metadata whether a data container included in the local backup data is absent in the remote backup data; and
   deleting the data container included in the local backup data, in response to determining that the data container included in the local backup data is absent in the remote backup data.

4. The system of claim 2, wherein the reconciling of the local backup data with the remote backup data further comprises:
   determining from the metadata whether a data container included in the remote backup data is absent in the local backup data; and
   deleting the data container included in the remote backup data, in response to determining that the data container included in the remote backup data is absent in the local backup data.

5. An article of manufacture for controlling a first and a second computational device, wherein the article of manufacture is capable of causing operations, the operations comprising:
   storing a first set of backup data in the first computational device;
   storing a second set of backup data in the second computational device; and
   maintaining metadata corresponding to the first set of backup data in the second computational device;
   grouping the second set of backup data into a group that is comprised of a plurality of constituent data containers; and
   reconciling the first set of backup data with the second set of backup data based on the metadata, wherein all constituent data containers of the group are deleted from the second set of backup data, in response to determining during the reconciling of the first set of backup data with the second set of backup data that at least one of the constituent data containers is absent in the first set backup data, wherein during the reconciling a status of previously initiated asynchronous backup copy operations is determined, wherein if the previously initiated asynchronous backup operations have completed then the first and the second computational devices are updated to reflect that any data container that is present is representative of completion of the previously initiated asynchronous backup copy operations.

6. The article of manufacture of claim 5, wherein the first computational device is a local system and the second computational device is a remote server, wherein the first set of backup data is local backup data and the second set of backup data is remote backup data.

7. The article of manufacture of claim 6, wherein the reconciling of the local backup data with the remote backup data further comprises:
   determining from the metadata whether a data container included in the local backup data is absent in the remote backup data; and deleting the data container included in the local backup data, in response to determining that the data container included in the local backup data is absent in the remote backup data.

8. The article of manufacture of claim 6, wherein the reconciling of the local backup data with the remote backup data further comprises:
   determining from the metadata whether a data container included in the remote backup data is absent in the local backup data; and
   deleting the data container included in the remote backup data, in response to determining that the data container included in the remote backup data is absent in the local backup data.

9. A computer program product comprising a computer readable storage medium, wherein a computer readable program is stored in the computer readable storage medium, wherein the computer readable program when executed on a processor causes the processor to perform operations, the operations comprising:
   storing a first set of backup data in a first computational device;
   storing a second set of backup data in a second computational device; and
   maintaining metadata corresponding to the first set of backup data in the second computational device;
   grouping the second set of backup data into a group that is comprised of a plurality of constituent data containers; and
   reconcile the first set of backup data with the second set of backup data based on the metadata, wherein all constituent data containers of the group are deleted from the second set of backup data, in response to determining during the reconciling of the first set of backup data with the second set of backup data that at least one of the constituent data containers is absent in the first set backup data, wherein during the reconciling a status of previously initiated asynchronous backup copy operations is determined, wherein if the previously initiated asynchronous backup operations have completed then the first and the second computational devices are updated to reflect that any data container that is present is representative of completion of the previously initiated asynchronous backup copy operations.

10. The computer program product of claim 9, wherein the first computational device is a local system and the second computational device is a remote server, wherein the first set of backup data is local backup data and the second set of backup data is remote backup data.

11. The computer program product of claim 10, wherein the reconciling of the local backup data with the remote backup data further comprises:
   determining from the metadata whether a data container included in the local backup data is absent in the remote backup data; and
   deleting the data container included in the local backup data, in response to determining that the data container included in the local backup data is absent in the remote backup data.

12. The computer program product of claim 10, wherein the reconciling of the local backup data with the remote backup data further comprises:
   determining from the metadata whether a data container included in the remote backup data is absent in the local backup data; and
   deleting the data container included in the remote backup data, in response to determining that the data container included in the remote backup data is absent in the local backup data.

* * * * *